US008712763B2

(12) United States Patent
Zhang et al.

(10) Patent No.: US 8,712,763 B2
(45) Date of Patent: *Apr. 29, 2014

(54) METHOD FOR ENCODING SIGNAL, AND METHOD FOR DECODING SIGNAL

(71) Applicant: Huawei Technologies Co., Ltd., Guangdong (CN)

(72) Inventors: Dejun Zhang, Beijing (CN); Lei Miao, Beijing (CN); Jianfeng Xu, Shenzhen (CN); Fengyan Qi, Beijing (CN); Qing Zhang, Shenzhen (CN); Lixiong Li, Shenzhen (CN); Fuwei Ma, Shenzhen (CN); Yang Gao, Misssion Viejo, CA (US)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/943,812

(22) Filed: Jul. 17, 2013

(65) Prior Publication Data

US 2013/0304460 A1    Nov. 14, 2013

Related U.S. Application Data

(63) Continuation of application No. 13/172,575, filed on Jun. 29, 2011, now Pat. No. 8,515,744, which is a continuation of application No. PCT/CN2009/076306, filed on Dec. 30, 2009.

(30) Foreign Application Priority Data

Dec. 31, 2008  (CN) ........................ 2008 1 0247427
Jun. 25, 2009  (CN) ........................ 2009 1 0151835

(51) Int. Cl.
*G10L 21/00*   (2013.01)

(52) U.S. Cl.
USPC ........... 704/207; 704/209; 704/500; 704/502; 704/503; 704/504

(58) Field of Classification Search
USPC ................................ 704/207, 219, 500–504
See application file for complete search history.

(56) References Cited

U.S. PATENT DOCUMENTS 5,652,903  A * 7/1997  Weng et al. ..................... 712/35
5,659,698  A * 8/1997  Weng et al. .................. 711/220
(Continued)

FOREIGN PATENT DOCUMENTS

CN    1465044 A    12/2003
CN    1922659 A    2/2007
(Continued)

OTHER PUBLICATIONS

ISO/IEC 14496-3 :"Infomation technology—coding of audio-visual objects—part 3: Audio, Amendment 2: Audio Lossless Coding (ALS), new audio profiles and BSAC extensions", Jan. 10, 2007, total 90 pages.
(Continued)

*Primary Examiner* — Leonard Saint Cyr
(74) *Attorney, Agent, or Firm* — Huawei Technologies Co., Ltd

(57) ABSTRACT

The present disclosure relates to a method, apparatus, and system for encoding and decoding signals. The encoding method includes: converting a first-domain signal into a second-domain signal; performing Linear Prediction (LP) processing and Long-Term Prediction (LTP) processing for the second-domain signal; obtaining a long-term flag value according to a decision criterion; obtaining a second-domain predictive signal according to the LP processing result and the LTP processing result when the long-term flag value is a first value; obtaining a second-domain predictive signal according to the LP processing result when the long-term flag value is a second value; converting the second-domain predictive signal into a first-domain predictive signal, and calculating a first-domain predictive residual signal; and outputting a bit stream that includes the first-domain predictive residual signal.

21 Claims, 9 Drawing Sheets

(56) References Cited

U.S. PATENT DOCUMENTS

| | | |
|---|---|---|
| 5,933,803 A | 8/1999 | Ojala |
| 6,094,630 A | 7/2000 | Nomura |
| 6,240,386 B1 | 5/2001 | Thyssen et al. |
| 6,947,888 B1 | 9/2005 | Huang |
| 2004/0024593 A1 | 2/2004 | Tsuji et al. |
| 2004/0148162 A1 | 7/2004 | Fingscheidt et al. |
| 2004/0167772 A1* | 8/2004 | Erzin ............................ 704/207 |
| 2005/0075873 A1* | 4/2005 | Makinen ........................ 704/230 |
| 2005/0102136 A1* | 5/2005 | Makinen et al. .............. 704/214 |
| 2005/0192797 A1 | 9/2005 | Makinen |
| 2005/0251387 A1 | 11/2005 | Jelinek et al. |
| 2006/0143002 A1 | 6/2006 | Ojanpera |
| 2007/0143118 A1 | 6/2007 | Chen et al. |
| 2007/0239462 A1 | 10/2007 | Makinen et al. |
| 2009/0024386 A1* | 1/2009 | Su et al. ........................ 704/201 |
| 2013/0304460 A1 | 11/2013 | Dejun et al. |

FOREIGN PATENT DOCUMENTS

| | | |
|---|---|---|
| CN | 101197576 A | 6/2008 |
| CN | 101197577 A | 6/2008 |
| EP | 0848374 A2 | 6/1998 |
| EP | 0848374 B1 | 3/2004 |
| EP | 1388146 B1 | 11/2007 |
| JP | 6130994 A | 5/1994 |
| JP | 07239699 A | 9/1995 |
| JP | 2004517348 A | 6/2004 |
| JP | 2012514225 A | 6/2012 |
| RU | 2316059 C2 | 1/2008 |
| RU | 2319222 C1 | 3/2008 |
| WO | 9516260 A1 | 6/1995 |
| WO | 0235522 A1 | 5/2002 |
| WO | 02095734 A2 | 11/2002 |
| WO | 2005081231 A1 | 9/2005 |
| WO | 2007128661 A1 | 11/2007 |
| WO | 2010075792 A1 | 7/2010 |

OTHER PUBLICATIONS

Florin Ghido et al. :"Accounting for companding nonlinearities in lossless audio compression", Apr. 15, 2007, total 4 pages.

ITU-T G.711.0; Transmission Systems and Media,Digital Systems and Networks; Digital terminal equipments—Coding of voice and audio signals; Sep. 2009; total 72 pages.

* cited by examiner

METHOD FOR ENCODING SIGNAL, AND METHOD FOR DECODING SIGNAL

CROSS-REFERENCE TO RELATED APPLICATIONS

This application is a continuation of U.S. patent application Ser. No. 13/172,575, filed on Jun. 29, 2011, which is a continuation of International Application No PCT/CN2009/076306, filed on Dec. 30, 2009. The International Application PCT/CN2009/076306 claims priority to Chinese Patent Application No. 200810247427.6, filed on Dec. 31, 2008, and Chinese Patent Application No. 200910151835.6, filed on Jun. 25, 2009. All of the aforementioned patent applications are hereby incorporated by reference in their entireties.

TECHNICAL FIELD

The present disclosure relates to speech encoding and decoding, and in particular, to methods, apparatuses, and system for encoding and decoding signals.

BACKGROUND

One of the coding models widely applied in the speech coding field is Code Excited Linear Prediction (CELP) model. The CELP model uses an almost white excitation signal to excite two time-varying linear recursive filters. The excitation signal is generally selected out of a codebook composed of Gaussian white noise sequences. The feedback loop of each filter includes a predictor. One of the predictors is a long-term predictor (or a pitch predictor), which is represented by $P(z)$. $P(z)$ is used to generate the tone structure of a voiced speech (for example, the fine structure of a spectrum). Another common predictor is a short-term predictor, represented by $F(z)$. $F(z)$ is used to recover the short-term spectrum envelope of a speech. This model derives from its reverse process. That is, $F(z)$ is used to remove the redundancy of a near sample point of the speech signal, and $P(z)$ is used to remove the redundancy of a far sample point of the speech signal. A normalized residual signal is obtained through two levels of prediction. The residual signals take on standard normal distribution approximately.

When the CELP model is applied to the lossy compression field, a speech signal $x(i)$ undergoes a Linear Predictive Coding (LPC) analysis first to obtain a LPC residual signal $res(i)$. After the LPC residual signal $res(i)$ is framed, each subframe signal undergoes a Long-Term Prediction (LTP) analysis to obtain a corresponding adaptive codebook and an adaptive codebook gain. The adaptive codebook may be searched out in many methods such as autocorrelation. After the long-term dependence of the LPC residual signal $res(i)$ is removed, a LTP residual signal $x2(i)$ is obtained. After an algebraic codebook is used to characterize or fit the LTP residual signal $x2(i)$, the whole coding process is completed. Finally, the adaptive codebook and the fixed codebook are coded and written into the bit stream, and a joint vector quantization or a scalar quantization is performed for the adaptive codebook gain and the fixed codebook gain. In the codebook, either the adaptive codebook gain or the fixed codebook gain is selected as the best gain. The index corresponding to the best gain is transmitted to the decoder. The whole coding process takes place in a Pulse Code Modulation (PCM) domain.

In the lossless compression field, a Moving Pictures Experts Group Audio Lossless Coding (MPEG ALC) apparatus also uses the short-term and long-term dependence of speech signals for prediction. Its prediction process is: first, a LPC analysis is performed for a speech signal, and a LPC coefficient undergoes entropy coding and is written into a bit stream; second, LTP is performed for the LPC residual signal to obtain the pitch and the pitch gain of the LTP, and the LPC residual signal is written into the bit stream; after the LTP, the LTP residual signal is obtained; and then, finally, the LTP residual signal undergoes entropy coding and is written into the bit stream, and the whole coding process is ended.

In the prior art described above, when the speech signal is less periodic, the LTP processing almost makes no contribution. In this case, the LTP residual signal is still written into the bit stream. Consequently, the pitch gain quantization consumes too many bits, and the compression performance of the coder is reduced.

SUMMARY

Embodiments of the present disclosure provide method, apparatus, and system for encoding and decoding signals to improve the compression performance of the codec.

In a first aspect, a signal encoding method is provided. The method includes:
converting a first-domain signal into a second-domain signal;
performing a Linear Predictive (LP) processing and a Long-Term Prediction (LTP) processing for the second-domain signal;
obtaining a long-term flag value according to a decision criterion;
obtaining a second-domain predictive signal according to the LP processing result and the LTP processing result when the long-term flag value is a first value, or obtaining a second-domain predictive signal according to the LP processing result when the long-term flag value is a second value;
converting the second-domain predictive signal into a first-domain predictive signal, and calculating a first-domain predictive residual signal; and
outputting a bit stream that comprises the first-domain predictive residual signal.

In a second aspect, a signal decoding method is provided. The method includes:
decoding a received bit stream to obtain a first-domain predictive residual signal;
decoding the first sample point of a current frame of the bit stream;
performing the following decoding steps consecutively for every sample point starting from the second sample point of the current frame:
calculating an Linear Predictive (LP) signal of the sample point according to a second-domain signal of the decoded sample point;
obtaining a second-domain predictive signal according to the LP signal and an LTP contribution signal if an obtained long-term flag value is a first value, wherein the LTP contribution signal is obtained according to the LP residual signal of the decoded sample point;
obtaining a second-domain predictive signal according to the LP signal if they obtained long-term flag value is not a first value;
converting the second-domain predictive signal into a first-domain predictive signal, and decoding a first-domain signal of the current sample point according to the first-domain predictive residual signal and the first-domain predictive signal; and converting the first-domain signal of the current sample point into a second-domain signal, and obtaining an LP residual signal according to the second-domain signal and the LP signal.

In a third aspect, a signal encoding apparatus is provided. The signal encoding apparatus includes:
- a converting module, configured to convert a first-domain signal into a second-domain signal, and convert a second-domain predictive signal into a first-domain predictive signal;
- an Linear Predictive (LP) module, configured to perform a LP processing for the second-domain signal;
- an Long-Term Prediction (LTP) module, configured to perform a LTP processing for the second-domain signal;
- a deciding module, configured to obtain a long-term flag value according to a decision criterion;
- a second-domain prediction module, configured to obtain the second-domain predictive signal according to the LP processing result and the LTP processing result of the second-domain signal when the long-term flag value is a first value; and obtain the second-domain predictive signal according to the LP processing result of the second-domain signal when the long-term flag value is a second value;
- a first-domain predictive residual module, configured to calculate a first-domain predictive residual signal according to the first-domain predictive signal;
- an outputting module, configured to output a bit stream that includes the first-domain predictive residual signal.

In a fourth aspect, a signal decoding apparatus is provided. The signal decoding apparatus includes:
- a bit stream decoding module, configured to decode a received bit stream to obtain a first-domain predictive residual signal;
- a first sample point decoding module, configured to decode a first sample point of the signals of a current frame;
- an LP module, configured to calculate an LP signal of a current sample point according to a second-domain signal of the decoded sample point;
- a second-domain prediction module, configured to obtain a second-domain predictive signal according to the LP signal and an LTP contribution signal if an obtained long-term flag value is a first value, or obtain a second-domain predictive signal according to the LP signal if the obtained long-term flag value is not a first value, where the LTP contribution signal is obtained according to the LP residual signal of the decoded sample point;
- a converting module, configured to: convert the second-domain predictive signal into a first-domain predictive signal, and convert the first-domain signal of the current sample point into the second-domain signal;
- a current sample point decoding module, configured to decode the first-domain signal of the current sample point according to the first-domain predictive residual signal and the first-domain predictive signal; and
- an LP residual module, configured to obtain an LP residual signal according to the second-domain signal and the LP signal.

In a fifth aspect, a signal encoding/decoding (codec) system is provided. The signal codec system includes:
- a signal encoding apparatus, configured to: convert a first-domain signal into a second-domain signal; perform a Linear Predictive (LP) processing and a Long-Term Prediction (LTP) processing for the second-domain signal; obtain a long-term flag value according to a decision criterion; obtain a second-domain predictive signal according to the LP processing result and the LTP processing result of the second-domain signal when the long-term flag value is a first value; or obtain a second-domain predictive signal according to the LP processing result of the second domain signal when the long-term flag value is a second value; convert the second-domain predictive signal into a first-domain predictive signal, and calculate a first-domain predictive residual signal; and output a bit stream that includes the first-domain predictive residual signal; and
- a signal decoding apparatus, configured to: decode the received bit stream to obtain the first-domain predictive residual signal and the long-term flag value; decode a first sample point of the signals of a current frame; perform the following decoding steps consecutively for every current sample point from a second sample point of the signals of the current frame: calculate an LP signal of a current sample point according to the second-domain signal of the decoded sample point; obtain the second-domain predictive signal according to the LP signal and an LTP contribution signal if the obtained long-term flag value is the first value, or obtain the second-domain predictive signal according to the LP signal if the obtained long-term flag value is not the first value, where the LTP contribution signal is obtained according to the LP residual signal of the decoded sample point; convert the second-domain predictive signal into the first-domain predictive signal, and decode the first-domain signal of the current sample point according to the first-domain predictive residual signal and the first-domain predictive signal; and convert the first-domain signal of the current sample point into the second-domain signal, and obtain the LP residual signal according to the second-domain signal and the LP signal.

According to the embodiments of the present disclosure, a subsequent encoding or decoding process is performed adaptively according to a long-term flag value; when the long-term flag value is a second value, it is not necessary to consider the LTP processing result, thus improving the compression performance of the codec.

DETAILED DESCRIPTION

Figure 1:
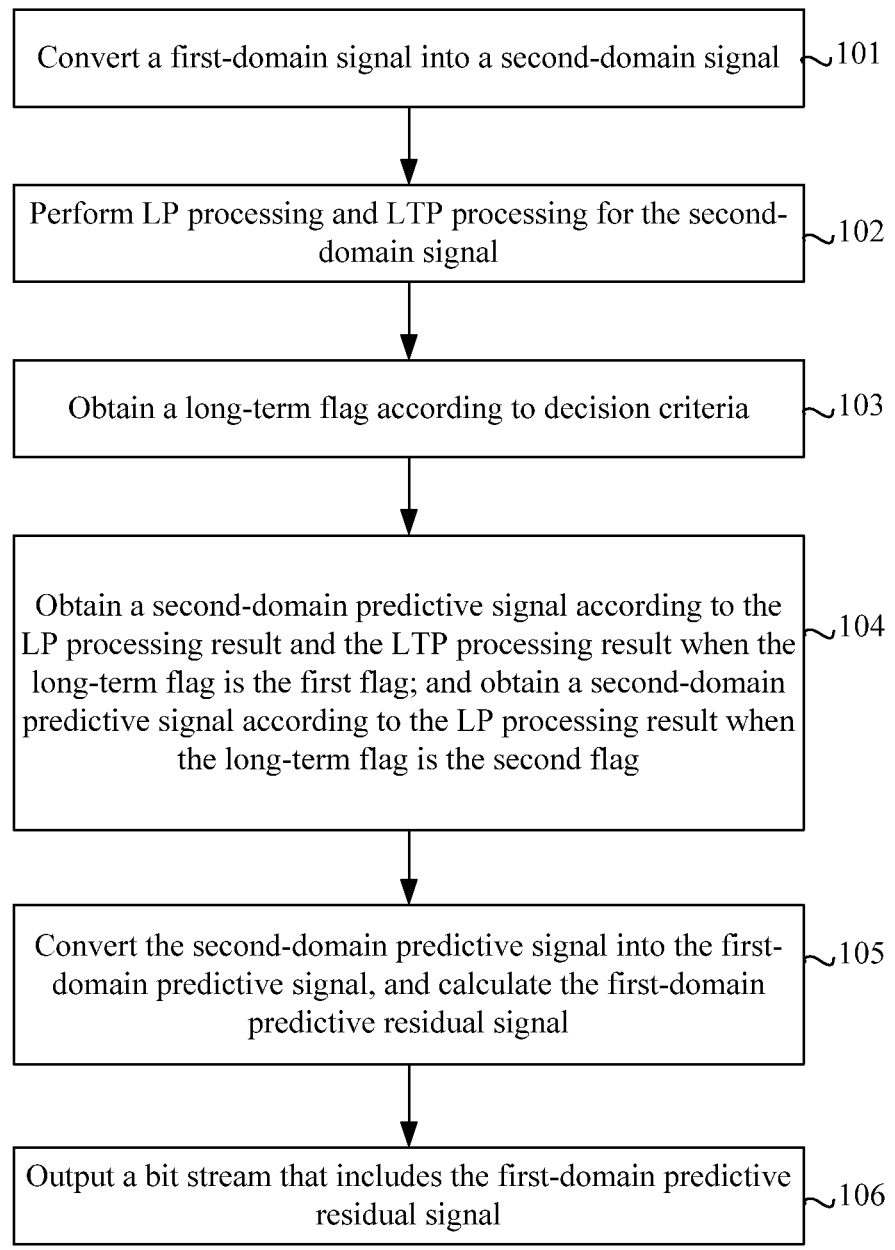
FIG. 1 is a flowchart of a signal encoding method according to the first embodiment of the present disclosure.

The present disclosure is hereinafter described in more detail with reference to accompanying drawings and exemplary embodiments.
First Embodiments
FIG. 1 is a flowchart of a signal encoding method according to the first embodiment of the present disclosure. The method includes the following steps:

Step 101: Convert a first-domain signal into a second-domain signal.

Step 102: Perform a Linear Predictive (LP) processing and a Long-Term Predication (LTP) processing for the second-domain signal.

Step 103: Obtain a long-term flag value according to a decision criterion.

Step 104: Obtain a second-domain predictive signal according to the LP processing result and the LTP processing result of the second-domain signal when the long-term flag value is a first value; or obtain a second-domain predictive signal according to the LP processing result of the second-domain signal when the long-term flag value is a second value.

Step 105: Convert the second-domain predictive signal into the first-domain predictive signal, and calculate a first-domain predictive residual signal.

Step 106: Output a bit stream that includes the first-domain predictive residual signal.

Figure 2:
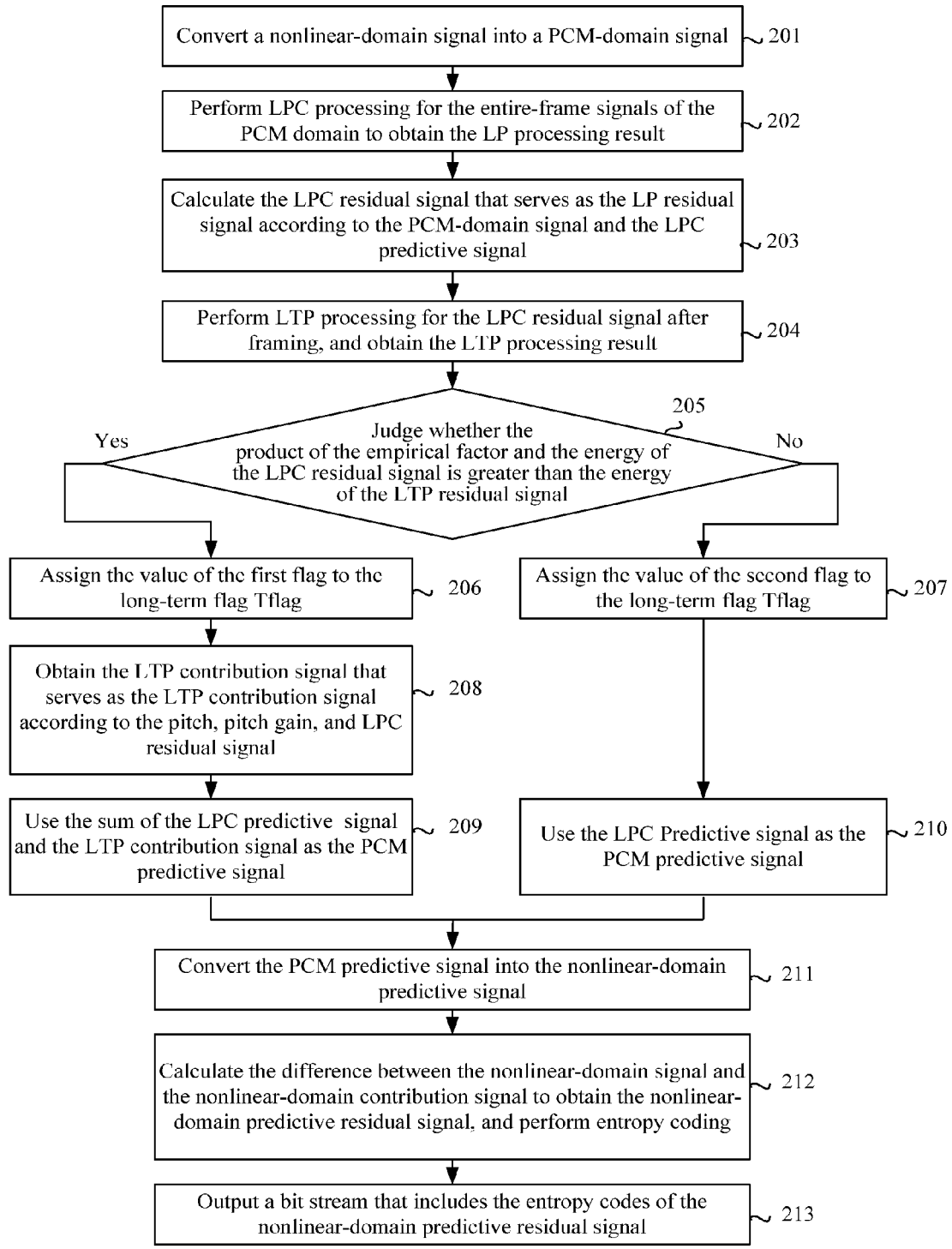
FIG. 2 is a flowchart of a signal encoding method according to the second embodiment of the present disclosure.

In this embodiment, the long-term flag value is obtained according to the decision criterion; the second-domain predictive signal is obtained according to the LP processing result and the LTP processing result when the long-term flag value is the first value, or the second-domain predictive signal is obtained according to the LP processing result when the long-term flag value is the second value, and the bit stream is obtained according to the second-domain predictive signal. In this embodiment, the subsequent encoding process is performed adaptively according to the long-term flag value. When the long-term flag value is the second value, it is not necessary to consider the LTP processing result, thus improving the compression performance of the codec.
Second Embodiment
FIG. 2 is a flowchart of a signal encoding method according to the second embodiment of the present disclosure. In this embodiment, the first domain is a nonlinear domain, and further, the first domain may be an A-law or Mu-law domain; the second domain is a PCM domain; the LP processing is a Linear Predictive Coding (LPC) processing, and the LTP processing is a Long Term Prediction processing.

The method according to this embodiment includes the following steps:

Step 201: Convert a nonlinear-domain signal into a PCM-domain signal.

Input signals may be formatted in frames. A frame length L is represented by the number of samples in a frame. Supposing that x(i) represents the nonlinear-domain signal, and y(i) represents the PCM-domain signal, where i is the $i^{th}$ sample in the frame. Also supposing that the conversion process involves precision loss, and the corresponding back-conversion process involves no precision loss.

Step 202: Perform the LPC processing for the entire-frame signal y(i) of the PCM domain to obtain an LP processing result. The LP processing result includes a LPC predictive signal y'(i) which serves as an LP signal, and an LP coefficient, as expressed in the following equation:

$$y'(i) = \sum_{j=1}^{lpc\_order} a_j \cdot y(i-j) \quad (1)$$

$$i = 1, 2, \ldots, L-1$$

where $a_j$ is an LP coefficient; L is the frame length; and lpc_order is an LP order. Supposing y'(0)=0, when i<0, y(i)=0.

Step 203: Calculate a LPC residual signal res(i) that serves as an LP residual signal according to the PCM-domain signal y(i) and the LPC predictive signal y'(i), where the LPC residual signal may also be regarded as the LP processing result.

$$res(i) = y(i) - y'(i) \quad i = 0, 1, \ldots, L-1 \quad (2)$$

Step 204: Perform framing for the LPC residual signal res(i), and then perform an LTP processing to obtain an LTP processing result. The framing operation is optional, and it may be an adaptive framing operation. The LTP processing result includes a pitch and a pitch gain.

Specifically, the LTP processing in this step may include: performing a pitch search for the LPC residual signal, obtaining the best pitch of the LPC residual signal, or obtaining both the best pitch and the pitch gain of the LPC residual signal.

Specifically, this step may include:
if no framing is performed, performing the pitch search for the PCM-domain signal of the current frame to obtain the best pitch of the PCM-domain signal, and then performing a fine search for the LPC residual signal according to the best pitch of the PCM-domain signal to obtain the best pitch of the LPC residual signal or obtain both the best pitch and the pitch gain of the LPC residual signal; if framing is performed, before the framing operation, performing pitch search for the PCM-domain signal of the current frame to obtain the best pitch of the PCM-domain signal, using the best pitch of the PCM-domain signal of the current frame as the best pitch of the first subframe, and performing framing for the LPC residual signal according to the best pitch; performing a fine search for the pitch of each subframe in the residual domain, namely, searching for the pitch of each subframe around the pitch of the previous subframe, thus facilitating differential coding for the subframe pitch, and obtaining the best pitch of each subframe, or obtaining both the best pitch and the pitch gain.

In the foregoing process of searching for a pitch, if no pitch gain is obtained, the pitch gain may be selected adaptively according to the obtained best pitch.

In the LPC processing, the prediction result of the first few samples is generally inaccurate. To avoid impacting the LTP performance, this embodiment specifies that the first M samples do not participate in the LTP processing, where M is a specified number. The pitch search is performed for the LPC residual signals res(i) of the samples other than the first M samples to obtain the pitch, pitch gain, and LTP residual signal z(i) of each subframe.

Figure 3:
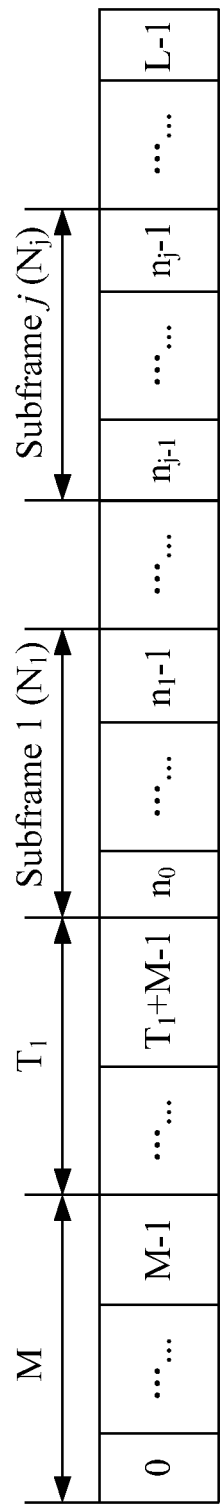
FIG. 3 shows signals of a frame after framing in the signal encoding method according to the second embodiment of the present disclosure.

FIG. 3 shows signals of a frame after framing in the signal encoding method according to the second embodiment of the present disclosure. The first M samples do not participate in the framing or LTP processing, and the relation between M and lpc_order is: $0 \leq M \leq lpc\_order$. $T_1$ represents the pitch of the first subframe, and the samples from M to $T_1+M-1$ are the samples in the buffer. Supposing $n_0 = T_1+M$, then the samples from $n_0$ to $n_1-1$ are the samples in the first subframe, and the length of the first subframe is $N_1=n_1-n_0$. By analogy, the samples from $n_{j-1}$ to $n_j-1$ are the samples in subframe j, and the length of subframe j is $N_j=n_j-n_{j-1}$. The total quantity of samples of the signals in a frame is L.

For the samples from 0 to $T_1+M-1$, the following equation applies:

$$z(i)=res(i)\ i=0,1,\ldots,T_1+M-1 \quad (3)$$

where z(i) are LTP residual signals.

For the samples of the first subframe, the following equation applies:

$$z(i)=res(i)-g_1 \cdot res(i-T_1)\ i=n_0,\ldots,n_1-1 \quad (4)$$

where $g_1$ represents the pitch gain of the first subframe.

For the samples of subframe j, the following equation applies:

$$z_j(i)=res_j(i)-g_j \cdot res_j(i-T_j)\ i=n_{j-1},\ldots,n_j-1 \quad (5)$$

where $T_j$ represents the pitch of subframe j, and $g_j$ represents the pitch gain of subframe j.

Step 205: Judge whether a product of an empirical factor and the energy of the LPC residual signals res(i) (which have undergone no LTP processing) is greater than the energy of the LTP residual signals z(i) (which have undergone LTP processing); if so, proceed to step 206; otherwise, go to step 207.

$$E1 = \sum_{i=k}^{L-1} z(i) \cdot z(i) \quad (6)$$

$$E = \sum_{i=k}^{L-1} res(i) \cdot res(i) \quad (7)$$

E1 represents the energy of the LTP residual signal z(i); E represents the energy of the LPC residual signal res(i); and k may be 0 or M. This step judges whether E*fac is greater than E1, where fac is the empirical factor. Generally, fac=0.94.

As an another embodiment, an alternative of this step is: Judge whether the product of the empirical factor and the sum of absolute values of the LPC residual signals res(i) (which have undergone no LTP processing) is greater than the sum of absolute values of the LTP residual signals z(i) (which have undergone LTP processing); if so, proceed to step 206; otherwise, go to step 207.

Step 206: Assign a first value to the long-term flag Tflag. Specifically, let Tflag be 1. Go to step 208.

The long-term flag may be a trigger signal for the LTP processing. If Tflag is equal to 1, the LTP processing is performed.

Step 207: Assign a second value to the long-term flag Tflag. Specifically, let Tflag be 0. Go to step 210. If Tflag is equal to 0, the LTP processing is not performed.

Step 208: Obtain an LTP contribution signal res'(i) according to the pitch, pitch gain and the LPC residual signal res(i). This step may also be included in step 204. That is, this step may be included in the LTP processing, and the LTP processing result further includes the LTP contribution signal res'(i), as expressed in equation (8):

$$res'(i)=g \cdot res(i-T) \quad (8)$$

Step 209: Use the sum of the LPC predictive signal y'(i) and the LTP contribution signal res'(i) as the PCM predictive signal y"(i), and go to step 211, as expressed in equation (9):

$$y''(i)=y'(i)+res'(i) \quad (9)$$

Step 210: Use the LPC predictive signal y'(i) as the PCM predictive signal y"(i), and proceed to step 211, as expressed in equation (10):

$$y''(i)=y'(i) \quad (10)$$

Step 211: Convert the PCM predictive signal y"(i) into the nonlinear-domain predictive signal x'(i), as expressed in equation (11):

$$x'(i)=PCM\ 2A[y''(i)] \quad (11)$$

The function PCM 2A[ ] refers to converting the PCM-domain signal into the A-law domain signal.

Step 212: Calculate the difference between x(i) and x'(i) to obtain the nonlinear-domain predictive residual signal, and perform entropy coding for the nonlinear-domain predictive residual signal.

Step 213: Output the bit stream that includes the entropy code of the nonlinear-domain predictive residual signal and the long-term flag value. Specifically, when Tflag is equal to 0, the bit stream further includes an LPC coefficient $a_j$; when Tflag is equal to 1, the bit stream further includes an LPC coefficient $a_j$, a pitch, and a pitch gain.

In some instances, in the length-varying coding field, when Tflag is equal to 0, the LTP processing is not performed, and there is no need to include the long term flag value in the bit stream; when Tflag is equal to 1, the LTP processing is performed, and the long term flag value is included in the bit stream, and this bit stream further includes an LPC coefficient $a_j$, a pitch, and a pitch gain.

In this embodiment, by judging whether the product of the empirical factor and the energy of the LPC residual signals (which have undergone no LTP processing) is greater than the energy of the LTP residual signals (which have undergone LTP processing), the system knows whether the LTP processing is performed or not. When the speech signals are less periodic, the LTP processing almost makes no contribution, and the LTP processing is not performed. Therefore, it is not necessary to consider the LTP contribution signals; fewer bits are consumed; and the compression performance of the encoder is improved.

Third Embodiment

Figure 4:
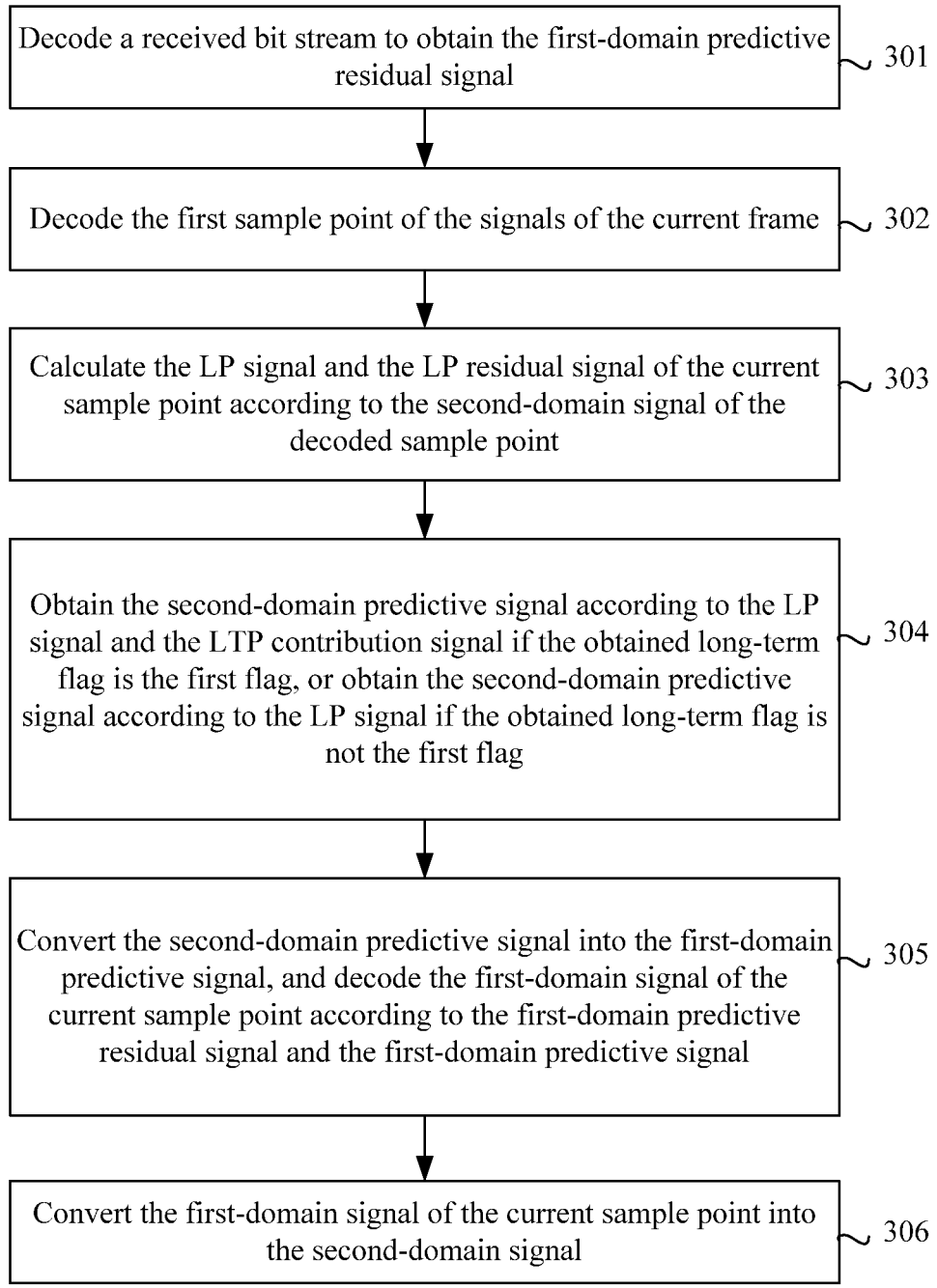
FIG. 4 is a flowchart of a signal decoding method according to the third embodiment of the present disclosure.

FIG. 4 is a flowchart of a signal decoding method according to the third embodiment of the present disclosure. The method in this embodiment may correspond to the signal encoding method in the first embodiment, and the definitions of the terms and parameter expressions in this embodiment are the same as those in the first embodiment. The method includes the following steps:

Step 301: Decode a received bit stream to obtain the first-domain predictive residual signal.

Step 302: Decode the first sample point of the signals of the current frame.

Perform the decoding steps 303-306 consecutively for every current sample point from the second sample point of the signals of the current frame:

Step 303: Calculate the LP signal and the LP residual signal of the current sample point according to the second-domain signal of the decoded sample point.

Step 304: Obtain the second-domain predictive signal according to the LP signal and the LTP contribution signal if the obtained long-term flag value is the first value, or obtain the second-domain predictive signal according to the LP signal if the obtained long-term flag value is not the first value, where the LTP contribution signal is obtained according to the LP residual signal of the decoded sample point.

Step 305: Convert the second-domain predictive signal into the first-domain predictive signal, and decode the first-domain signal of the current sample point according to the first-domain predictive residual signal and the first-domain predictive signal.

Step 306: Convert the first-domain signal of the current sample point into the second-domain signal.

In this embodiment, the subsequent decoding process is performed adaptively according to the long-term flag value; when the long-term flag value is the second value, it is not necessary to consider the LTP contribution signals, thus simplifying the decoding process.

Fourth Embodiment

Figure 5:
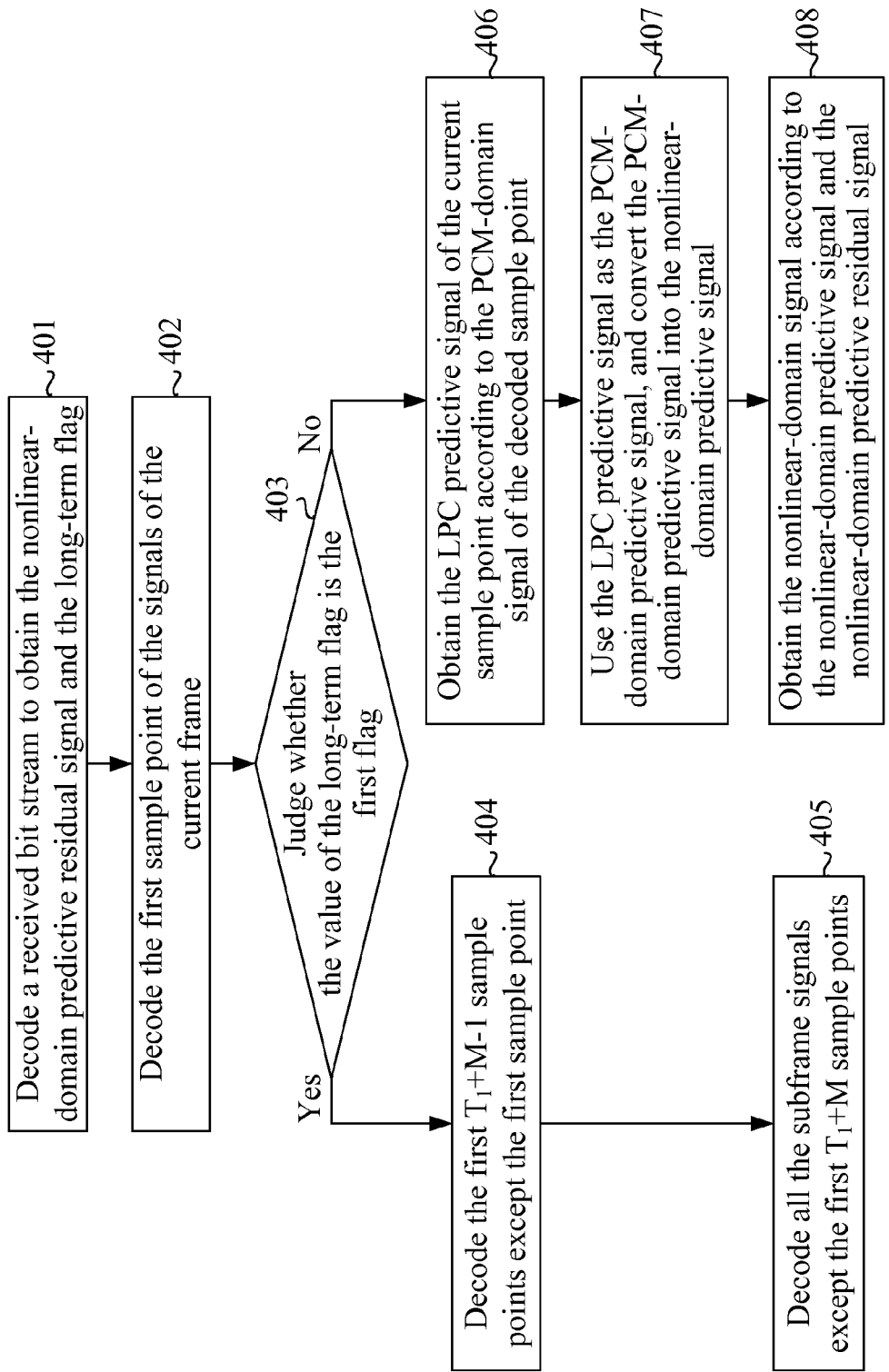
FIG. 5 is a flowchart of a signal decoding method according to the fourth embodiment of the present disclosure.

FIG. 5 is a flowchart of a signal decoding method according to the fourth embodiment of the present disclosure. The method in this embodiment may correspond to the signal encoding method in the second embodiment, and the definitions of the terms and parameter expressions in this embodiment are the same as those in the second embodiment. The method in this embodiment includes the following steps:

Step 401: Decode a received bit stream to obtain the nonlinear-domain predictive residual signal and the long-term flag value.

In some instances, if the bit stream is a bit stream encoded with the long-term flag value, the bit stream may be decoded to obtain the long-term flag value. Specifically, when the long-term flag value Tflag is equal to 0, the bit stream further includes an LPC coefficient $a_j$; when Tflag is equal to 1, the bit stream further includes an LPC coefficient $a_j$, a best pitch, and may further include a pitch gain. If the bit stream includes no pitch gain, the method in this embodiment further includes: selecting the pitch gain adaptively according to the best pitch.

Supposing d(i) represents the nonlinear-domain predictive residual signal, the following equation applies:

$$d(i)=x(i)-x'(i) \ i=0, 1, \ldots, L-1 \quad (12)$$

Therefore, the nonlinear-domain signal x(i) may be obtained through equation (13) after decoding:

$$x(i)=d(i)+x'(i) \ i=0, 1, \ldots, L-1 \quad (13)$$

Step 402: Decode the first sample point of the signals of the current frame.

The first sample point has undergone no LPC processing. Therefore, the nonlinear-domain predictive signal of the first sample point is x'(0)=0. Equation (13) reveals that the first sample point of the nonlinear domain may be decoded without loss, namely, x(0)=d(0).

For the subsequent decoding process, this embodiment needs to retain the PCM-domain signal y(0) of the first sample point and the LPC residual signal res(0) (namely, the LP residual signal), where:

$$y(0)=A2PCM[x(0)], \ res(0)=y(0) \quad (14)$$

The function A2PCM[ ] refers to converting the A-law domain signal into the PCM-domain signal.

In some instances, in the length-varying coding field, the received bit stream is decoded to obtain the first-domain predictive residual signal, without obtaining the long-term flag value which is the second value. When the decoding result includes the long-term flag value which is the first value, it indicates that the LTP module is enabled; otherwise, the LTP module is disabled. The system obtains the second-domain predictive signal according to the LP signal and the LTP contribution signal if the obtained long-term flag value is the first value, or obtains the second-domain predictive signal according to the LP signal if the obtained long-term flag value is not the first value, where the LTP contribution signal is obtained according to the LP residual signal of the decoded sample point.

Step 403: Judge whether the value of the long-term flag value is the first value; if it is the first value, proceed to steps 404-405; otherwise, skip to steps 406-408.

The LTP processing comes in two options: performed (Tflag=1), and not performed (Tflag=0). In this step, the system judges whether Tflag is equal to 1; alternatively, the system may judge whether Tflag is equal to 0 to know whether the LTP processing is performed. Different options of the LTP processing correspond to different subsequent decoding processes.

After completion of step 403 in this embodiment, the following decoding process is a cyclic recursive process. The following decoding steps are performed consecutively for every current sample point from the second sample point of the signals of the current frame:

In some instances, if the encoder side does not output the codes of the long-term flag value which is the second value, the system judges whether the first value is obtained as the long-term flag value; if it is the first value, steps 404-405 are performed; otherwise, steps 406-408 are performed.

Step 404: Decode the first $T_1+M-1$ samples except the first sample point.

The method in this embodiment corresponds to the signal encoding method in the second embodiment. That is, in the encoding process, the first M samples the current frame do not participate in the LTP processing. Therefore, in this embodiment, the first M samples and the samples in the buffer are decoded first.

Figure 6:
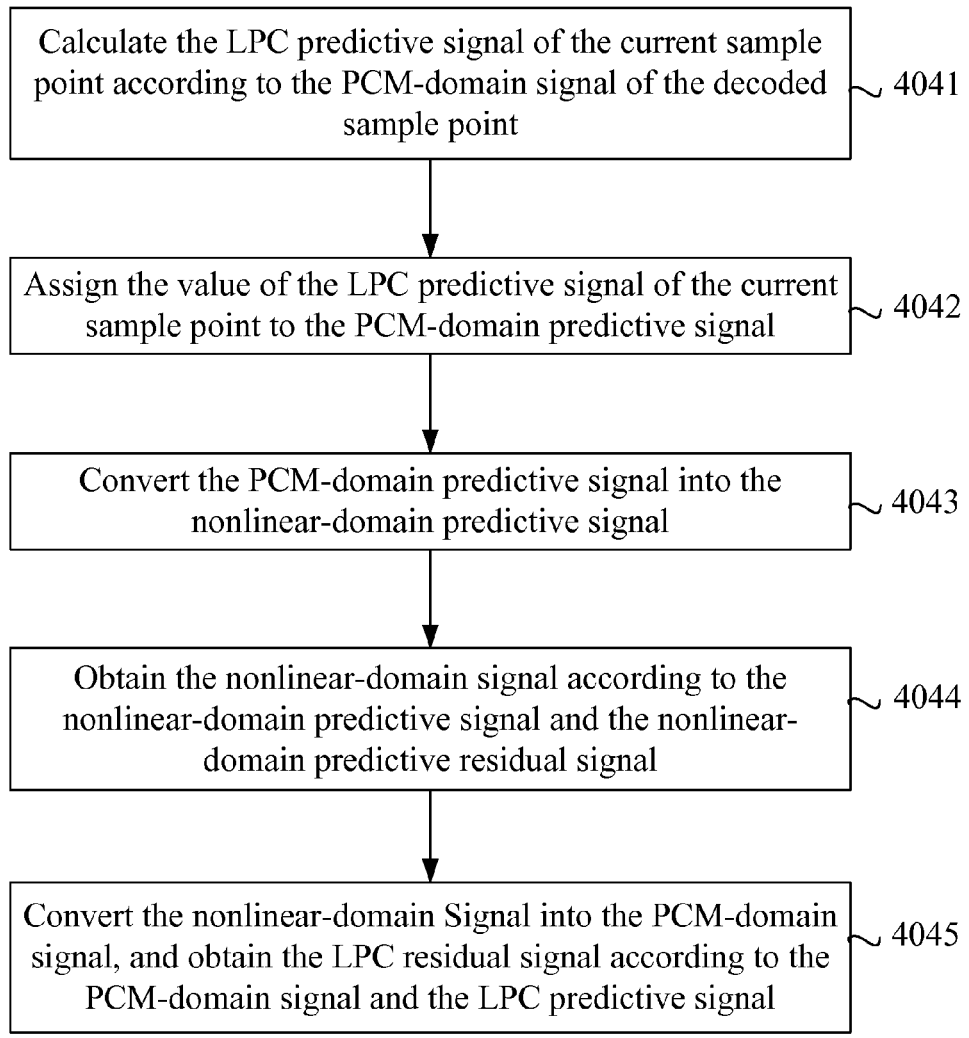
FIG. 6 is a flowchart of step 404 in the signal decoding method according to the fourth embodiment of the present disclosure.

FIG. 6 is a flowchart of step 404 in the signal decoding method in the fourth embodiment of the present disclosure. Further, step 404 may include the following steps:

Step 4041: Calculate the LPC predictive signal y'(i) of the current sample point according to the PCM-domain signal y(i) of the decoded sample point through equation (15):

$$y'(i) = \sum_{j=1}^{lpc\_order} a_j \cdot y(i-j) \quad (15)$$

$$i = 1, 2, \ldots, T_1 + M - 1$$

When i≤0, y(i)=0.

For example, if the current sample point is the second sample point of the signals of the current frame, the decoded sample point is the first sample point of the signals of the current frame. In this case, the decoding result in step 402 serves as a reference.

Step 4042: Obtain the PCM-domain predictive signal y"(i) according to the LPC predictive signal y'(i) of the current sample. Because the first $T_1+M$ samples are not involved in the LTP processing, y"(i)=y'(i). That is, the value of the LPC predictive signal of the current sample point is assigned to the PCM-domain predictive signal y"(i).

Step 4043: Convert the PCM-domain predictive signal y"(i) into the nonlinear-domain predictive signal x'(i):

$$x'(i)=PCM\ 2A[y"(i)] \quad (16)$$

Step 4044: Obtain the nonlinear-domain signal x(i) through equation (13) according to the nonlinear-domain predictive signal x'(i) and the nonlinear-domain predictive residual signal d(i).

Step 4045: For the purpose of decoding subsequent samples, convert the nonlinear-domain signal x(i) into the PCM-domain signal y(i), and obtain the LPC residual signal res(i) according to the PCM-domain signal y(i) and the LPC predictive signal y'(i).

$$res(i)=y(i)-y'(i) \ i=0, 1, \ldots, T_1+M-1 \quad (17)$$

Step 405: Decode all the subframe signals except the first $T_1+M$ samples.

Figure 7:
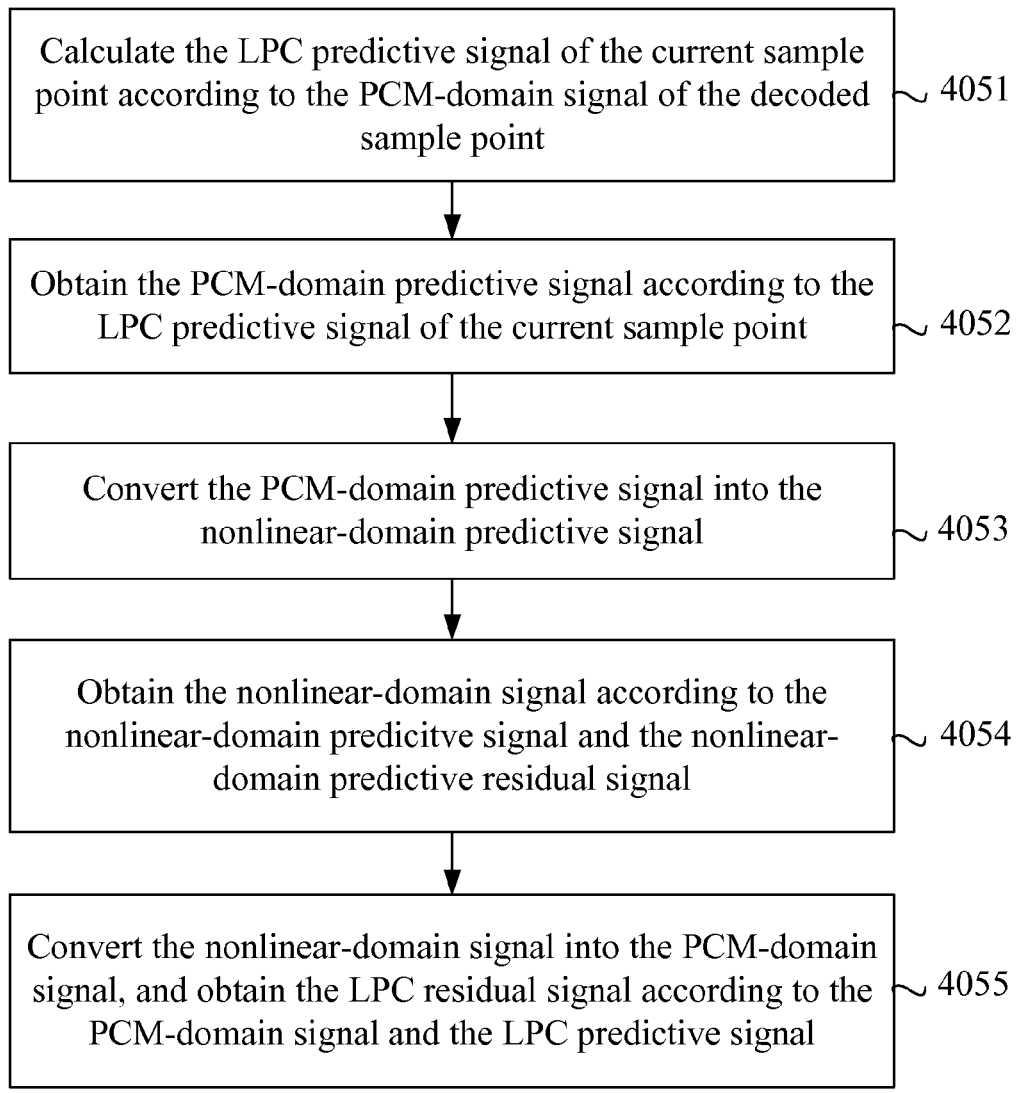
FIG. 7 is a flowchart of step 405 in the signal decoding method according to the fourth embodiment of the present disclosure.

FIG. 7 is a flowchart of step 405 in the signal decoding method according to the fourth embodiment of the present disclosure. Step 405 may include the following steps:

Step 4051: Calculate the LPC predictive signal y'(i) of the current sample point according to the PCM-domain signal y(i) of the decoded sample point through equation (18):

$$y'(i) = \sum_{j=1}^{lpc\_order} a_j \cdot y(i-j) \quad (18)$$

$$i = n_0, \ldots, L-1$$

When i≤0, y(i)=0.

For example, if the current sample point is the first sample point of the first subframe, the decoded samples are the first $T_1+M$ samples. In this case, the decoding result in step 404 serves as a reference.

Step 4052: Calculate the PCM-domain predictive signal y''(i) according to the LPC predictive signal y'(i) of the current sample point through equation (19):

$$y''(i)=y'(i)+res'(i)=y'(i)+g \cdot res(i-T) \quad (19)$$

Step 4053: Convert the PCM-domain predictive signal y''(i) into the nonlinear-domain predictive signal x'(i):

$$x'(i)=PCM \ 2A[y''(i)] \quad (20)$$

Step 4054: Obtain the nonlinear-domain signal x(i) through equation (13) according to the nonlinear-domain predictive signal x'(i) and the nonlinear-domain predictive residual signal d(i).

Step 4055: For the purpose of decoding subsequent samples, convert the nonlinear-domain signal x(i) into the PCM-domain signal y(i), and obtain the LPC residual signal res(i) according to the PCM-domain signal y(i) and the LPC predictive signal y'(i).

$$res(i)=y(i)-y'(i) \ i=n_0, \ldots, L-1 \quad (21)$$

After completion of decoding the current sample point, in the process of decoding subsequent samples, the LPC residual signal obtained in step 4055 is used to calculate the PCM-domain predictive signals of subsequent samples.

Step 406: Calculate the LPC predictive signal y'(i) of the current sample point according to the PCM-domain signal y(i) of the decoded sample point through equation (22):

$$y'(i) = \sum_{j=1}^{lpc\_order} a_j \cdot y(i-j) \quad (22)$$

$$i = 1, 2, \ldots, L-1$$

When i≤0, y(i)=0.

Step 407: Use the LPC predictive signal y'(i) as the PCM-domain predictive signal, and convert the PCM-domain predictive signal into the nonlinear-domain predictive signal x'(i).

Because the LTP module is disabled and no sample point of the current frame signals is involved in the LTP processing, y''(i)=y'(i), and y'(i) may be converted into x'(i) directly.

Step 408: Obtain the nonlinear-domain signal x(i) through equation (13) according to the nonlinear-domain predictive signal x'(i) and the nonlinear-domain predictive residual signal d(i).

In this embodiment, the subsequent decoding process is performed adaptively according to the long-term flag value; when the long-term flag value is the second value, it is not necessary to consider the LTP contribution signals, thus simplifying the decoding process.

Fifth Embodiment

Figure 8:
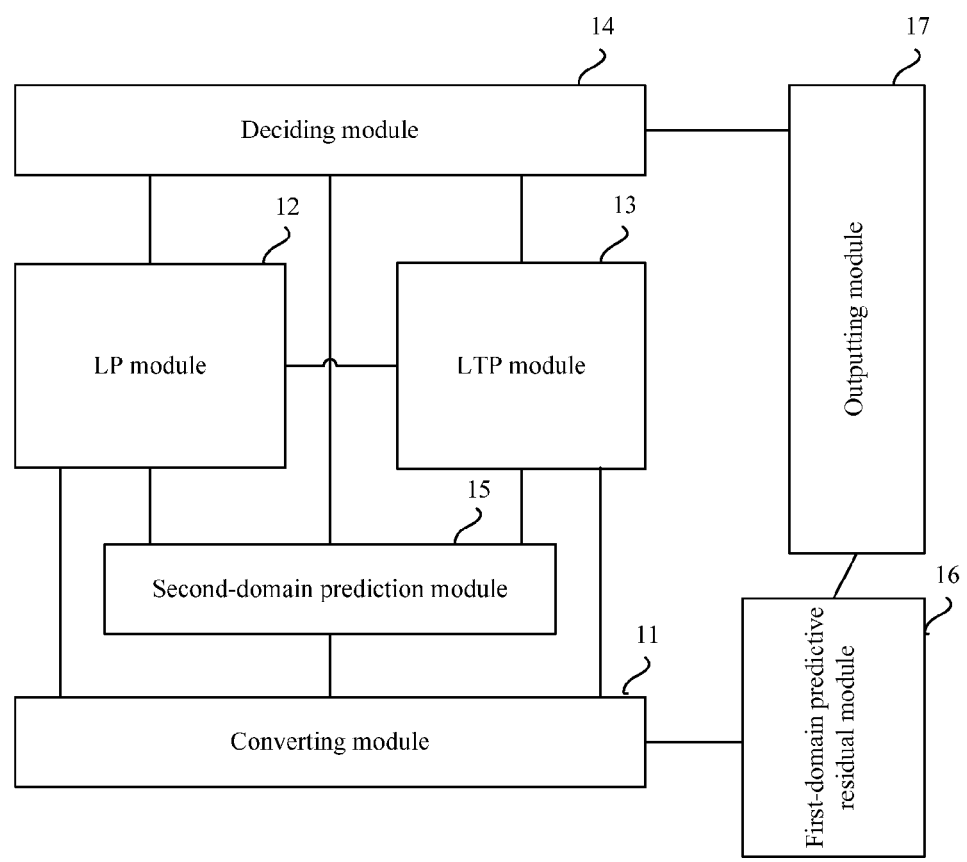
FIG. 8 is a simplified block diagram of a signal encoding apparatus according to a fifth embodiment of the present disclosure.

FIG. 8 shows a simplified structure of a signal encoding apparatus according to the fifth embodiment of the present disclosure. The apparatus includes: a converting module 11, an LP module 12, an LTP module 13, a deciding module 14, a second-domain prediction module 15, a first-domain predictive residual module 16, and an outputting module 17. The converting module 11 is configured to: convert a first-domain signal into a second-domain signal, and convert a second-domain predictive signal into a first-domain predictive signal. The LP module 12 is configured to perform LP processing for the second-domain signal. The LTP module 13 is configured to perform LTP processing for the second-domain signal. The deciding module 14 is configured to obtain a long-term flag value according to a decision criterion. The second-domain prediction module 15 is configured to: obtain the second-domain predictive signal according to the LP processing result and the LTP processing result when the long-term flag value is the first value, and obtain the second-domain predictive signal according to the LP processing result when the long-term flag value is the second value. The first-domain predictive residual module 16 is configured to calculate the first-domain predictive residual signal according to the first-domain predictive signal. The outputting module 17 is configured to output a bit stream that includes the first-domain predictive residual signal.

The foregoing LP processing result may include an LP coefficient, LP signals, and LP residual signals. The foregoing bit stream may further include an LP coefficient.

Further, the LTP module 13 may perform pitch search for the LP residual signals to obtain the best pitch or both the best pitch and the pitch gain of the LP residual signals, and obtain the LTP contribution signals. The LTP processing result may include the best pitch or both the best pitch and the pitch gain, LTP contribution signals, and LTP residual signals.

The second-domain prediction module 15 is configured to use the sum of the LP residual signal and the LTP contribution signal as the second-domain predictive signal when the long-term flag value is the first value, or use the LP signal as the second-domain predictive signal when the long-term flag value is the second value.

The deciding module 14 may make a decision according to one of the two decision criteria, namely, (a) judge whether the product of the empirical factor and the energy of the LP residual signal is greater than the energy of the LTP residual signal, or (b) judge whether the product of the empirical factor and the sum of the absolute values of the LP residual signals is greater than the sum of the absolute values of the LTP residual signals. If the product of the empirical factor and the energy of the LP residual signal is greater than the energy of the LTP residual signal, or the product of the empirical factor and the sum of the absolute values of the LP residual signals is greater than the sum of the absolute values of the LTP residual signals, the deciding module 14 assigns the value of the first flag to the long-term flag (i.e. the long-term flag value is the first value); otherwise, the deciding module 14 assigns the value of the second flag to the long-term flag (i.e. the long-term flag value is the second value).

The apparatus in this embodiment may further include a pitch gain module which selects the pitch gain adaptively according to the obtained best pitch, and may further include a framing module which performs framing for the LP residual signals.

In this embodiment, the subsequent encoding process is performed adaptively according to the long-term flag value; when the long-term flag value is the second value, it is not necessary to consider the LTP processing result, thus improving the compression performance of the codec.

Sixth Embodiment

Figure 9:
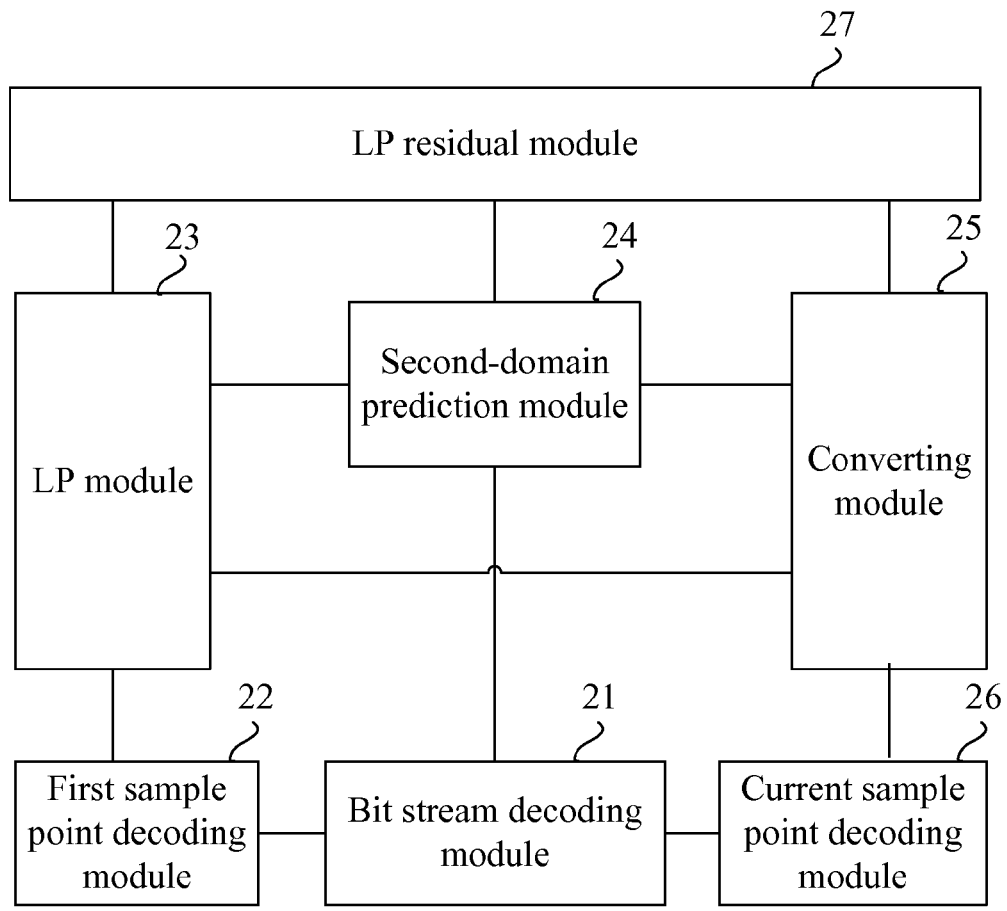
FIG. 9 is a simplified block diagram of a signal decoding apparatus according to a sixth embodiment of the present disclosure.

FIG. 9 shows a simplified structure of a signal decoding apparatus according to a sixth embodiment of the present disclosure. The apparatus includes: a bit stream decoding module 21, a first sample point decoding module 22, an LP module 23, a second-domain prediction module 24, a converting module 25, a current sample point decoding module 26, and an LP residual module 27. The bit stream decoding module 21 is configured to decode a received bit stream to obtain the first-domain predictive residual signal. The first sample point decoding module 22 is configured to decode the first sample point of the signals of the current frame. The LP module 23 is configured to calculate the LP signal of the current sample point according to the second-domain signal of the decoded sample point. The second-domain prediction module 24 is configured to: obtain the second-domain predictive signal according to the LP signal and the LTP contribution signal if the obtained long-term flag value is the first value, or obtain the second-domain predictive signal according to the LP signal if the obtained long-term flag value is not the first value, where the LTP contribution signal is obtained according to the LP residual signal of the decoded sample point. The converting module 25 is configured to convert the second-domain predictive signal into the first-domain predictive signal, and convert the first-domain signal of the current sample point into the second-domain signal. The current sample point decoding module 26 is configured to decode the first-domain signal of the current sample point according to the first-domain predictive residual signal and the first-domain predictive signal. The LP residual module 27 is configured to obtain the LP residual signal according to the second-domain signal and the LP signal.

Further, when the long-term flag value is the first value and the current sample point is involved in the LTP processing at the encoder, the second-domain prediction module 24 uses the sum of the LP signal and the LTP contribution signal as the second-domain predictive signal; when the long-term flag value is the first value and the current sample point is not involved in the LTP processing at the encoder, the second-domain prediction module 24 uses the LP signal as the second-domain predictive signal.

The apparatus in this embodiment may further include a pitch gain module which selects the pitch gain adaptively according to the obtained best pitch.

In this embodiment, the subsequent decoding process is performed adaptively according to the long-term flag value; when the long-term flag value is the second value, it is not necessary to consider the LTP contribution signals, thus simplifying the decoding process.

Seventh Embodiment

Figure 10:
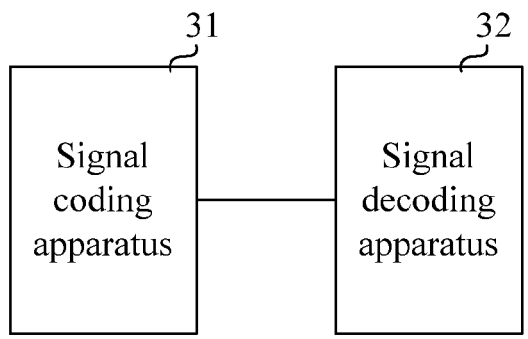
FIG. 10 is a simplified block diagram of a signal codec system according to a seventh embodiment of the present disclosure.

FIG. 10 shows a simplified structure of a signal codec system according to a seventh embodiment of the present disclosure. The system includes a signal encoding apparatus 31 and a signal decoding apparatus 32.

The signal encoding apparatus 31 is configured to convert a first-domain signal into a second-domain signal; perform LP processing and LTP processing for the second-domain signal; obtain a long-term flag value according to a decision criterion; obtain the second-domain predictive signal according to the LP processing result and the LTP processing result when the long-term flag value is the first value; obtain the second-domain predictive signal according to the LP processing result when the long-term flag value is the second value; convert the second-domain predictive signal into the first-domain predictive signal, and calculate the first-domain predictive residual signal; and output a bit stream that includes the first-domain predictive residual signal.

The signal decoding apparatus 32 is configured to decode the received bit stream to obtain the first-domain predictive residual signal; decode the first sample point of the signals of the current frame; perform the following decoding steps consecutively for every current sample point from the second sample point of the signals of the current frame: calculate the LP signal of the current sample point according to the second-domain signal of the decoded sample point; obtain the second-domain predictive signal according to the LP signal and the LTP contribution signal if the obtained long-term flag value is the first value, where the LTP contribution signal is obtained according to the LP residual signal of the decoded sample point; or obtain the second-domain predictive signal according to the LP signal if the obtained long-term flag value is not the first value; convert the second-domain predictive signal into the first-domain predictive signal, and decode the first-domain signal of the current sample point according to the first-domain predictive residual signal and the first-domain predictive signal; and convert the first-domain signal of the current sample point into the second-domain signal, and obtain the LP residual signal according to the second-domain signal and the LP signal.

Further, the signal encoding apparatus 31 in this embodiment may be any signal coding apparatus described in the foregoing embodiments; and the signal decoding apparatus 32 may be any signal decoding apparatus described in the foregoing embodiments.

It is understandable to those skilled in the art that all or part of the steps of the foregoing method embodiments may be implemented by hardware instructed by a program. The program may be stored in a computer-readable storage medium. When being executed, the program performs steps of the foregoing method embodiments. The storage medium may be any medium suitable for storing program codes, for example, a Read Only Memory (ROM), a Random Access Memory (RAM), a magnetic disk, or a compact disk.

What is claimed is:

1. A signal encoding method, comprising:
converting a first-domain signal into a second-domain signal;
performing a Linear Prediction (LP) processing and a Long-Term Prediction (LTP) processing for the second-domain signal to obtain a LP processing result and a LTP processing result, wherein the LP processing result comprises a LP signal and a LP residual signal, and the LTP processing result comprises a LTP residual signal, a best pitch of the LP residual signal or both the best pitch of the LP residual signal and a pitch gain of the LP residual signal;
obtaining a long-term flag value based on a comparison between the LP residual signal and the LTP residual signal;
if the long-term flag value is a first value, obtaining a second-domain predictive signal based on the LP processing result and the LTP processing result, or, if the long-term flag value is a second value, obtaining the second-domain predictive signal based on the LP processing result;

converting the second-domain predictive signal into a first-domain predictive signal, and calculating a first-domain predictive residual signal; and outputting a bit stream that comprises the first-domain predictive residual signal.

2. The method of claim 1, wherein the second-domain signal is formatted into frames, each frame comprises one or more sample points, wherein the LP processing result comprises the LP residual signal at the one or more sample points and further comprises one or more LP coefficients corresponding to the one or more sample points, and wherein the bit stream further comprises the LP coefficients.

3. The method of claim 2, wherein the LTP residual signal at the one or more sample points is calculated based on the LP residual signal at the one or more sample points, and obtaining the long-term flag value based on a comparison between the LP residual signal and the LTP residual signal comprises:

calculating an energy of the LP residual signal by taking a sum of the energy of the LP residual signal at some or all of the one or more sample points;

calculating an energy of the LTP residual signal by taking a sum of the energy of the LTP residual signal at some or all of the one or more sample points;

assigning the first value to the long-term flag if the product of the energy of the LP residual signals and empirical factor is greater than the energy of the LTP residual signals; or assigning the second value to the long-term flag if the product of the energy of the LP residual signals and the empirical factor is not greater than the energy of the LTP residual signals.

4. The method of claim 1, wherein the LTP processing result further comprises a LTP contribution signal.

5. The method of claim 4, wherein obtaining the second-domain predictive signal based on the LP processing result and the LTP processing result comprises:

using the sum of the LP signal and the LTP contribution signal as the second-domain predictive signal.

6. The method of claim 1, wherein before performing the LP processing, the method further comprises:

performing a pitch search for the second-domain signal; and obtaining a best pitch of the second-domain signal.

7. The method of claim 6, wherein performing the LTP processing comprises:

performing a fine search for the LP residual signal according to the best pitch of the second-domain signal;

obtaining the best pitch of the LP residual signal or both the best pitch of the LP residual signal and the pitch gain of the LP residual signal; and obtaining an LTP contribution signal according to the LP residual signal and one of the best pitch of the LP residual signal and the pitch gain of the LP residual signal.

8. The method of claim 6, wherein after performing the pitch search for the second-domain signal and obtaining the best pitch of the second domain signal, the method further comprises:

selecting a pitch gain of the second-domain signal adaptively according to the obtained best pitch of the second-domain signal.

9. The method of claim 1, wherein obtaining the second-domain predictive signal based on the LP processing result comprises:

using the LP signal as the second-domain predictive signal.

10. The method of claim 1, wherein obtaining the long-term flag value based on a comparison between the LP residual signal and the LTP residual signal comprises:

assigning the first value to the long-term flag if the product of the energy of the LP residual signal and an empirical factor is greater than the energy of the LTP residual signal; or assigning the second value to the long-term flag if the product of the energy of the LP residual signal and the empirical factor is not greater than the energy of the LTP residual signal.

11. A signal decoding method, comprising:

decoding a received bit stream to obtain a first-domain predictive residual signal and a long-term flag value, wherein the first-domain predictive residual signal is formatted into frames, each frame comprises one or more sample points;

decoding the first sample point of a current frame of the first-domain predictive residual signal;

performing the following decoding steps consecutively for every current sample point of the current frame of the first-domain predictive residual from the second sample point of the current frame of the first-domain predictive residual signal:

calculating a Linear Prediction (LP) signal of a current sample point according to a second-domain signal of the decoded sample point, wherein the bit stream comprises both a best pitch and a pitch gain, or both the bit stream comprises the best pitch and a pitch gain;

if the long-term flag value is a first value, obtaining a second-domain predictive signal according to the LP signal and a Long-Term Prediction (LTP) contribution signal, wherein the LTP contribution signal is obtained based on the LP residual signal of the decoded sample point; or if the long-term flag value is not the first value, obtaining the second-domain predictive signal based on the LP signal;

converting the second-domain predictive signal into a first-domain predictive signal, and decoding a first-domain signal of the current sample point according to the first-domain predictive residual signal and the first-domain predictive signal; and converting the first-domain signal of the current sample point into a second-domain signal, and obtaining an LP residual signal according to the second-domain signal and the LP signal.

12. The method of claim 11, wherein obtaining a second-domain predictive signal according to the LP signal and an LTP contribution signal comprises:

if the current sample point in encoder side participates in the LTP processing, using the sum of the LP residual signal and the LTP contribution signal as the second-domain predictive signal;

if the current sample point in encoder side does not participate in the LTP processing, using the LPC predictive signal as the second-domain predictive signal.

13. A signal encoding apparatus, comprising a signal converter, a signal processor and a signal output, wherein the signal converter is configured to convert a first-domain signal into a second-domain signal;

the signal processor is configured to:

perform a Linear Prediction (LP) processing and a Long-Term Prediction (LTP) processing for the second-domain signal to obtain a LP processing result and a LTP processing result, wherein the LP processing result comprises a LP signal and a LP residual signal, the LTP processing result comprises a LTP residual signal, a best pitch of the LP residual signal or both the best pitch of the LP residual signal and a pitch gain of the LP residual signal;

obtain a long-term flag value based on a comparison between the LP residual signal and the LTP residual signal; and obtain a second-domain predictive signal based on the LP processing result and the LTP processing result if the long-term flag value is a first value, or obtain the second-domain predictive signal based on the LP processing result if the long-term flag value is a second value;

the signal converter is further configured to convert the second-domain predictive signal into a first-domain predictive signal;

the signal processor is further configured to calculate a first-domain predictive residual signal according to the first-domain predictive signal; and the signal output is configured to output a bit stream that comprises the first-domain predictive residual signal.

14. The apparatus of claim 13, wherein the second-domain signal is formatted into frames, each frame comprises one or more sample points, wherein the LP processing result comprises the LP residual signal at the one or more sample points and further comprises one or more LP coefficients corresponding to the one or more sample points, and wherein the bit stream further comprises the LP coefficients.

15. The apparatus of claim 14, wherein the LTP residual signal at the one or more sample points is calculated based on the LP residual signal at the one or more sample points; and in obtaining the long-term flag value based on a comparison between the LP residual signal and the LTP residual signal, the signal processor is configured to:
calculate an energy of the LP residual signal by taking a sum of the energy of the LP residual signal at some or all of the one or more sample points;
calculate an energy of the LTP residual signal by taking a sum of the energy of the LTP residual signal at some or all of the one or more sample points;
assign the first value to the long-term flag if a product of the energy of the LP residual signal and an empirical factor is greater than the energy of the LTP residual signal; or
assign the second value to the long-term flag if the product of the energy of the LP residual signal and the empirical factor is not greater than the energy of the LTP residual signal.

16. The apparatus of claim 13, wherein before performing the LP processing, the signal processor is further configured to:
perform a pitch search for the second-domain signal and obtain a best pitch of the second-domain signal; and
select a pitch gain of the second-domain signal adaptively according to the obtained best pitch of the second-domain signal.

17. The apparatus of claim 13, wherein the LTP processing result further comprises a LTP contribution signal, and wherein in obtaining the second-domain predictive signal, the signal processor is configured to:
use the sum of the LP residual signal and the LTP contribution signal as the second-domain predictive signal if the long-term flag value is the first value; or
use the LPC predictive signal as the second-domain predictive signal if the long-term flag value is the second value.

18. A signal decoding apparatus, comprising:
a bit stream decoding module, configured to decode a received bit stream to obtain a first-domain predictive residual signal and a long-term flag value, wherein the first-domain predictive residual signal is formatted into frames, each frame comprises one or more sample points;
a first sample point decoding module, configured to decode a first sample point of a current frame signal;
a sample point decoding module, configured to perform the following decoding steps consecutively for every current sample point of the current frame of the first-domain predictive residual from the second sample point of the current frame of the first-domain predictive residual signal:
calculate an LP signal of a current sample point according to a second-domain signal of the decoded sample point, wherein the bit stream comprises both a best pitch and a pitch gain, or both the bit stream comprises the best pitch and a pitch gain; and
obtain a second-domain predictive signal according to the LP signal and a Long-Term Prediction (LTP) contribution signal if the obtained long-term flag value is a first value, or obtain a second-domain predictive signal according to the LP signal if the obtained long-term flag value is not a first value, wherein the LTP contribution signal is obtained according to the LP residual signal of the decoded sample point;
a converting module, configured to convert the second-domain predictive signal into a first-domain predictive signal, and convert the first-domain signal of the current sample point into the second-domain signal;
a current sample point decoding module, configured to decode the first-domain signal of the current sample point according to the first-domain predictive residual signal and the first-domain predictive signal; and
an LP residual module, configured to obtain an LP residual signal according to the second-domain signal and the LP signal,
wherein at least one of the bit stream decoding module, the first sample point decoding module, the sample point decoding module, the converting module, the current sample point decoding module or the LP residual module, is a hardware module.

19. The apparatus of claim 18, wherein
if the long-term flag value is a first value and the current sample point in encoder participates in the LTP processing, the sum of the LP residual signal and the LTP contribution signal is used as the second-domain predictive signal;
if the long-term flag value is a first value and the current sample point in encoder does not participate in the LTP processing, the LPC predictive signal is used as the second-domain predictive signal.

20. The apparatus of claim 18, wherein the apparatus further comprises:
a pitch gain module, configured to selecting the pitch gain adaptively according to the best pitch.

21. A signal codec system, comprising:
a signal coding apparatus, configured to convert a first-domain signal into a second-domain signal, perform a Linear Prediction (LP) processing and a Long-Term Prediction (LTP) processing for the second-domain signal to obtain a LP processing result and a LTP processing result, wherein the LTP processing result comprises a LTP residual signal, a best pitch of the LP residual signal or both the best pitch of the LP residual signal and a pitch gain of the LP residual signal, obtain a long-term flag value; obtain a second-domain predictive signal based on the LP processing result and the LTP processing result if the long-term flag value is a first value, or obtain a second-domain predictive signal based on the LP processing result if the long-term flag value is a second value; convert the second-domain predictive signal into a first-domain predictive signal, and calculate a first-domain predictive residual signal according to the first-domain predictive signal; and output a bit stream that comprises the first-domain predictive residual signal;

a signal decoding apparatus, configured to decode the received bit stream to obtain the first-domain predictive residual signal and the long-term flag value, wherein the first-domain predictive residual signal is formatted into frames, each frame comprises one or more sample points; decode a first sample point of the signals of a current frame, and perform the following decoding steps consecutively for every current sample point from a second sample point of the signals of the current frame of the first-domain predictive residual from the second sample point of the current frame of the first-domain predictive residual signal:

calculating an LP signal of a current sample point according to the second-domain signal of the decoded sample point, wherein the bit stream comprises both a best pitch and a pitch gain, or both the bit stream comprises the best pitch and a pitch gain; obtaining the second-domain predictive signal according to the LP signal and an LTP contribution signal if the obtained long-term flag value is the first value, or obtaining the second-domain predictive signal according to the LP signal if the obtained long-term flag value is not the first value, wherein the LTP contribution signal is obtained according to the LP residual signal of the decoded sample point, converting the second-domain predictive signal into the first-domain predictive signal; decoding the first-domain signal of the current sample point according to the first-domain predictive residual signal and the first-domain predictive signal, converting the first-domain signal of the current sample point into the second-domain signal, and obtaining the LP residual signal according to the second-domain signal and the LP signal.

* * * * *